United States Patent Office 3,133,909
Patented May 19, 1964

3,133,909
MONOAZO DYESTUFFS
Henri Riat, Arlesheim, Switzerland, assignor to
Ciba Company, Inc., Fair Lawn, N.J.
No Drawing. Filed Oct. 6, 1959, Ser. No. 844,638
Claims priority, application Switzerland Oct. 13, 1958
1 Claim. (Cl. 260—146)

This invention provides valuable new monoazo-dyestuffs which contain at least one strongly acid group imparting solubility in water and correspond to the formula (1)

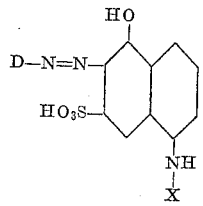

in which D represents the radical of a diazo-component which advantageously contains a sulfonic acid group, and X represents a reactive substituent.

As reactive substituents X there may be mentioned, for example, $\alpha:\beta$-unsaturated acyl radicals of aliphatic carboxylic acids, such as the acryl radical, the $\alpha$-chloracryl radical or a radical of the formula

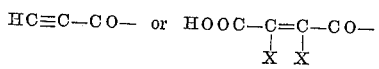

(in which one of the two X's represents a hydrogen atom and the other X a chlorine atom) or advantageously a radical containing a mobile hydrogen atom. In such radicals the mobile halogen atom, that is to say, the halogen atom capable of reacting with fibrous materials in the presence of an alkali, may be bound in a heterocyclic radical containing two nitrogen atoms, for example, a pyrimidine radical or an acyl radical of an acid containing at least one acid group of the formula

for example, the acyl radical of cyanuric acid or of an aliphatic carboxylic acid. In the case of the acyl radical of cyanuric acid the dyestuffs contain at least one halogen atom bound to a 1:3:5-triazine ring, for example, a dichlorotriazine radical or a monochlorotriazine radical such as the radical of the formula

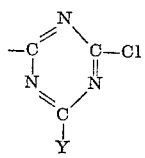

in which Y represents an amino group which may be substituted or a substituted hydroxyl or thio group. The halogenated acyl radicals of aliphatic carboxylic acids advantageously contain few carbon atoms, for example, two or three carbon atoms. As examples there may be mentioned the chloracetyl radical, the $\alpha$- or $\beta$-chloropropionyl radical and above all the $\alpha:\beta$-dichloropropyl radical.

Especially valuable are those dyestuffs of the Formula 1, in which X represents a monochloro-1:3:5-triazine radical and D represents a benzene or naphthalene radical, and above all complex heavy metal compounds thereof. Apart from sulfonic acid groups or carboxylic acid groups, the radical D may contain further substituents, such as alkoxy, hydroxyl, acylamino, cyano, sulfonyl, sulfamide or nitro groups and/or halogen atoms.

The dyestuffs of this invention can be made from the corresponding amino-monoazo-dyestuffs of the formula (2)

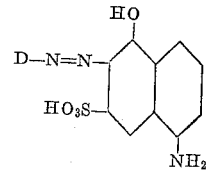

in which D has the meaning given above in connection with Formula 1 by methods in themselves known, for example, by acylating them with the anhydride or a halide of an acid of which the acyl radical is capable of reacting with the fibrous material with the formation of a chemical bond.

As such anhydrides or halides of acids having a reactive acyl radical, there may be mentioned for example, the anhydrides and halides of aliphatic $\alpha:\beta$-unsaturated carboxylic acids, for example, chloro-maleic anhydride, propionic acid chloride, acrylic acid chloride and especially the halides of aliphatic carboxylic acids containing mobile halogen atoms, such as chloracetyl chloride, sulfochloracetic acid chloride, $\beta$-bromo- or $\beta$-chloro-propionic acid chloride, $\alpha:\beta$-dichloropropionic acid chloride, and also trichloropyrimidine (the chloride of barbituric acid) and especially cyanuric chloride or a primary condensation product of cyanuric chloride which contains two chlorine atoms and, instead of the third chlorine atom, a primary amino group or an organic radical. Such primary condensation products of 1 mol of cyanuric chloride and 1 mol of a reactive organic mercapto- or hydroxyl-compound (for example, 1 mol of a phenol or an alcohol), 1 mol of amonia or 1 mol of an organic amine (such as methylamine, isopropylamine, cyclohexylamine or phenylamine, dimethylamine, ethylamine, ethanolamine, N - ethyl - phenylamine, $\gamma$-methoxypropylamine, morpholine, phenylhydrazine sulfonic acid, aminoethane sulfonic acid, aminoacetic acid, ortho-, meta- or para-aminobenzoic acid, aminobenzene sulfonic acids, such as phenol sulfonic acids, or ortho-, meta- or para-aminobenzene sulfonic acid and 1-aminobenzene-2:5-disulfonic acid, aminonaphthalene sulfonic acids, for example, 2-aminonaphthalene-4:8-disulfonic acid, and also mercaptoacetic acid or the like) can be made by methods in themselves known. Alternatively, for example, 2:4:6-tribromo- or 2:4:6-trichloro-1:3:5-triazine may be reacted, on the one hand, with a dyestuff of the Formula 2 to form a dihalogen-triazine condensation product and, on the other, with amonia or an organic mercapto- or hydroxyl compound or with an organic at most secondary monamine to form a monohalogen-triazine condensation product.

The condensations are advantageously carried out with the use of an acid-binding agent, such as sodium carbonate or sodium hydroxide, and under conditions such that one or two exchangeable halogen atoms remain in the final product, that is to say, for example, by working in an organic solvent or at a relatively low temperature in an aqueous organic or aqueous medium.

In order to prepare the acylatable starting dyestuffs of the Formula 2 a diazo-compound, especially one of the benzene or naphthalene series, may be coupled in a weakly acid, neutral or weakly alkaline medium with 1-amino-5-oxynaphthalene-7-sulfonic acid or a corresponding N-acyl derivative, and, when a 1-N-acylamino-5-oxynaphthalene-7-sulfonic acid is used as coupling component, the acyl group is removed after coupling by hydrolysis in a manner in itself known.

As examples of suitable coupling components there may be mentioned 1-amino-5-oxynaphthalene-7-sulfonic acid and its N-acyl derivative.

As examples of amines the diazo compounds of which can be used for coupling with the aforesaid coupling components there may be mentioned the following:

Aniline, ortho-, meta- para-toluidine, otho-anisidine, chloro- and/or nitranilines,
1-aminobenzene-2-, -3- or -4-sulfonic acid,
1-aminobenzene-3- or -4-carboxylic acid,
1-aminobenzene-2:5-disulfonic acid,
4-amino-1-methoxybenzene-2-sulfonic acid,
2-amino-1-methoxybenzene-4-sulfonic acid,
3-amino-6-hydroxybenzoic acid-5-sulfonic acid,
5-acetylamino-2-aminobenzene-1-sulfonic acid,
4-acetylamino-2-aminobenzene-1-sulfonic acid,
5-acetylamino- or 5 - benzoylamino - 2 - aminobenzene-1- carboxylic acid,
1 -amino - 3[2':4'-dichlorotriazinyl(6)]-aminobenzene-4-sulfonic acid,
1-amino-3[2'-chloro - 4' - aminotriazinyl(6)] - aminobenzene-4-sulfonic acid,
Chloro- or nitroaminobenzene sulfonic acid,
1-aminonaphthalene-4-, -5-, -6- or -7-sulfonic acid,
2-aminonaphthalene-4-, -6-, -7- or -8-sulfonic acid,
2-aminonaphthalene-sulfonic acid,
2-aminonaphthalene-3:6-disulfonic acid,
1-aminonaphthalene-1:5-disulfonic acid,
2-aminonaphthalene-3:6-, -4:8-, -5:7- or -6:8-disulfonic acid,
1-(3'- or 4'-aminobenzoyl)-aminobenzene-3-sulfonic acid,
3-aminopyrene-8- or -10-monosulfonic acid,
3-aminopyrene-5:8- or -5:10-disulfonic acid,
4-nitro-4'-aminostilbene-2:2'-disulfonic acid,
O-acyl derivatives of aminonaphtholsulfonic acids, for example, the O-acyl derivatives of 1-amino-8-hydroxy-naphthalene-3:6- or -4:6-disulfonic acid,
Dehydrothiotoluidinesulfonic acid and above all amines yielding metallisable dyestuffs, such as
2-aminobenzoic acid-4- or -5-sulfonic acid,
2-aminobenzoic acid,
Nitro-aminobenzoic acids or
Aminophenols such as
4-chloro-, 4-nitro- or 4-methyl-2-aminophenol,
6-chloro-, 6-nitro- or 6-acetylamino-2-aminophenol-4-sulfonic acid,
2-aminophenol-4- or -5-sulfonic acid,
3-amino-2-hydroxybenzoic acid-5-sulfonic acid,
2-aminophenol-4- or -5-sulfonamide,
4:6-dinitro- or 4:6-dichloro-2-aminophenol,
4-chloro- or 4-nitro-2-aminophenol-6-sulfonic acid,
4-nitro-6-chloro-2-aminophenol, or
4-nitro-6-acetylamino-2-aminophenol.

When the amine of which the diazo compound is used for the manufacture of a parent dyestuff of the Formula 2 contains in a position vicinal to the amino group a grouping capable of forming metal complexes, for example a carboxyl, hydroxyl or alkoxy group such as a methoxy group, the resulting dyestuff of the Formula 2 can be converted, prior to the condensation, into a heavy metal complex compound, for example a complex copper, chromium, nickel or cobalt compound.

Suitable agents yielding metal are, for example, salts containing one of the afore-mentioned metals as the cation, such as chromium sulfates, cobalt acetate, cobalt sulfate, copper sulfate or copper acetate. In some cases it is of advantage to use a complex metal compound, for example in the form of a metal-amine complex such as a copper-amine sulfate from copper sulfate and ammonia, pyridine or monoethanolamine, or in the form of a compound in which one of the afore-mentioned metals is bound in complex union in the anion, for example a chromium compound of an organic hydroxycarboxylic acid such as salicyclic acid, or a complex cobalt or copper compound of an alkali metal salt of an aliphatic aminocarboxylic or hydroxycarboxylic acid, such as of glycocol, of lactic acid and above all of tartaric acid, such as sodium copper tartrate.

The treatment with the agent yielding metal may be performed by a method in itself known, for example, at room temperature or at a slightly higher temperature when a readily metallisable parent dyestuff has been used, or, when the metallisation is accompanied by dealkylation, at a temperature ranging from 50 to 120° C. under atmospheric pressure, for example, under reflux, or under superatmospheric pressure, the pH-value depending on the nature of metallisation process used. For example, acid coppering is carried out with copper sulfate, alkaline coppering with copper tetramine sulfate. If desired, the metallisation may be carried out in the presence of a solvent, such as alcohol, dimethyl formamide or the like.

The resulting metal compound may contain one atom of metal bound in complex union to one or two dyestuff molecules. When copper or nickel is used as agent yielding metal there are preferably formed compounds containing one atom of metal for every molecule of dyestuff, and, when chromium or more especially cobalt is used, the 1:2-types are easily formed and especially valuable.

Dyestuffs of the invention that contain no heavy metal bound in complex union can alternatively be obtained by a variant of the process described above, wherein a coupling component of the formula (3)

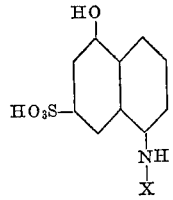

in which X represents a halogenated 1:3:5-triazine radical is coupled with a diazotised aromatic amine having sufficient coupling energy. As such amines are to be understood those which contain no hydroxyl group in the ortho-position relatively to the amino group.

The starting compounds of the Formula 3 can be prepared by methods in themselves known by acylating 1-amino-5-hydroxy-naphthalene-7-sulfonic acid with one of the aforesaid halides or anhydrides.

The dyestuffs of the present invention corresponding to the Formula 1 can be isolated and made up into useful dry dyestuff preparations. They are advantageously isolated out at as low a temperature as possible by salting out and filtration. The filtered dyestuff may be dried, if desired, after the addition of an extender and/or buffer, for example, after the addition of a mixture of equal parts of monosodium and disodium phosphate. The drying is advantageously carried out at not too high a temperature and under reduced pressure.

In some cases the dry preparations of the invention can be made directly, that is to say without intermediate isolation of the dyestuff, by subjecting to spray drying the mixture containing the dyestuff that is obtained in the manufacture of the dyestuff.

The dyestuffs of the invention are suitable for dyeing and printing a wide variety of materials, such as silk, leather, wool, superpolyamide fibres, superpolyurethanes, and more especially fibrous cellulosic materials, such as linen, cellulose, regenerated cellulose, and above all cotton. They are especially suitable for dyeing cellulose by the so-called pad dyeing method in which the material is impregnated with an aqueous dyestuff solution, which may contain a salt, and the dyestuff is fixed on the material by an alkaline treatment, preferably at an elevated temperature. This method, and also the direct-dyeing method which is suitable for many of the dyestuffs of the invention, yield dyeings that are generally distinguished by then good fastness to light and above all by their outstanding properties of wet fastness.

When cellulose fibers are printed with the new dyestuffs, valuable fast prints are obtained by fixing the dyestuff on the printed material by a heat treatment in the presence of an alkali.

After dyeing or printing, it is advantageous to remove as completely as possible any dyestuff that has not been fixed on the material. For this purpose the dyeing or print is thoroughly rinsed in warm water and then in cold water, and subjected to a soaping operation, in the presence of an non-ionic dispersing agent and/or wetting agent.

The following examples illustrate the invention, the parts and percentages being by weight.

EXAMPLE 1

A diazo-compound, prepared in the known manner from 18.9 parts of 2-aminophenol-4-sulfonic acid, is added to a solution, cooled to 5° C., of 26.1 parts of the sodium salt of 1-amino-5-hydroxynaphthalene-7-sulfonic acid, 30 parts of anhydrous sodium carbonate and 30 parts of pyridine in 400 parts of water, and the mixture is stirred until the coupling is complete. The excess of sodium carbonate is neutralised with hydrochloric acid, and the dyestuff is salted out with sodium chloride, filtered off and dried.

A solution of 43.9 parts of the dyestuff obtained in this manner in 1000 parts of water is treated with 30 parts of crystalline sodium acetate and then with 100 parts by volume of a molar solution of copper sulfate, and the whole is stirred for 1 hour at 40 to 45° C. The complex copper compound so formed is salted out, if desired, after the addition of a small proportion of acetic acid, filtered off and dissolved in 1000 parts of water.

A solution of 18.5 parts of cyanuric chloride in 50 parts of acetone is stirred into a mixture of 200 parts of water and 100 parts of ice. This suspension is treated with an aqueous solution of 19.5 parts of the sodium salt of 1-aminobenzene-3-sulfonic acid, and the liberated acid is neutralized by gradually adding sodium carbonate. When a free amino group can no longer be detected, the resulting solution of the primary condensation product is mixed with the solution of the copper complex compound prepared as described above, the mixture is heated to 30 to 40° C. and rendered weakly acid to neutral by adding a dilute solution of sodium carbonate. After 3 to 4 hours the monochlorotriazine dyestuff formed is salted out from the solution with sodium chloride, filtered off and dried in vacuo at 80° C.

It dyes cotton pure ruby-red tints which are very fast to washing and light.

It is not always necessary to isolate the copper complex before proceeding to the further working up. The crude coppering mixture can be used as it is.

When in the above Example the copper sulfate is replaced by an appropriate amount of nickel sulfate and the 1-aminobenzene-3-sulfonic acid used for the preparation of the primary condensation product by 1-aminobenzene-4-sulfonic acid, a dyestuff is obtained that dyes cotton covered, red-brown tints.

Dyeing Method 2 parts of the dyestuff is obtained in the above example are dissolved in 100 parts of water. A cotton fabric is impregnated with this solution until its weight shows an increase of 75%, and then dried.

The fabric is then impregnated with a solution at 20° C. containing per liter 10 grams of sodium hydroxide and 300 grams of sodium chloride, squeezed to a weight increase of 75%, steamed for 60 seconds at 100 to 101° C., rinsed, soaped for 15 minutes in a boiling solution of 0.3% strength of a non-ionic detergent, rinsed and dried. A ruby-red dyeing is obtained which is fast to washing.

Alternatively, the dyeing may be carried out as follows:

2 parts each of dyestuff and sodium carbonate are mixed with 25 parts of urea and dissolved in 75 parts of water. A cotton fabric is impregnated with this solution, squeezed to a weight increase of 75%, and dried at 90 to 100° C. The dry fabric is then exposed for 5 minutes to dry heat of 140° C., rinsed, soaped, again rinsed and finally dried. This method likewise produces a ruby-red dyeing which is fast to washing.

EXAMPLE 2

18.5 parts of cyanuric chloride are dissolved with heating in 60 parts of acetone, and this solution is poured into a mixture of 100 parts of water and 100 parts of ice. The resulting fine suspension is mixed with the solution of the copper complex compound obtained as described in the first and second paragraphs of Example 1, the mixture is stirred at 0 to 5° C., and the liberated acid is neutralised by the gradual addition of N-sodium hydroxide solution, and 40 parts of ammonia solution of 10% strength are then added. The reaction mixture is heated for 3 hours at 30 to 40° C. The monochlorotriazine dyestuff formed is salted out, filtered off and dried. It dyes cellulose fibers full, pure ruby-red tints.

Dyestuffs having similar properties, which dye cotton the tints shown in column III of the following table, are obtained by using the copper complexes obtained from the diazo compound of an amine in column I by the process described in one of the preceding examples, by treating said complexes with cyanuric chloride and with an amine shown in column II by the processes described in Examples 1 and 2.

| | I | II | III |
|---|---|---|---|
| 1 | 6-chloro-2-aminophenol-4-sulfonic acid. | 1-aminobenzene-2-sulfonic acid. | ruby-red. |
| 2 | ___do___ | 1-aminobenzene-2:5-disulfonic acid. | Do. |
| 3 | 4-chloro-2-aminophenol-6-sulfonic acid. | 1-aminobenzene-3-sulfonic aicd. | red-violet. |
| 4 | ___do___ | 1-aminobenzene-4-sulfonic acid. | Do. |
| 5 | 6-nitro-2-aminophenol-4-sulfonic acid. | 1-aminobenzene-3-sulfonic acid. | Do. |
| 6 | 2-aminophenol-4-sulfonic acid. | 2-aminonaphthalene-4:8-disulfonic acid. | ruby-red. |
| 7 | ___do___ | 1-aminonapthalene-4-sulfinic acid. | Do. |
| 8 | ___do___ | β-hydroxyethylamine. | Do. |
| 9 | ___do___ | γ-hydroxypropylamine. | Do. |
| 10 | ___do___ | isopropanolamine. | Do. |
| 11 | ___do___ | γ-methoxypropylamine. | Do. |
| 12 | ___do___ | diethanolamine. | Do. |
| 13 | ___do___ | anthranilic acid. | Do. |
| 14 | ___do___ | 1-aminobenzene-3-carboxylic acid. | Do. |
| 15 | ___do___ | morpholine. | Do. |
| 16 | ___do___ | 4-methyl-1-aminobenzene-3-sulfonic acid. | Do. |
| 17 | ___do___ | 1-aminobenzene-2-sulfonic acid. | Do. |
| 18 | 2-aminophenol-4:6-disulfonic acid. | ___do___ | Do. |
| 19 | ___do___ | ammonia. | Do. |
| 20 | ___do___ | aniline. | Do. |
| 21 | ___do___ | N-methylaniline. | Do. |
| 22 | ___do___ | p-toluidine. | Do. |
| 23 | ___do___ | monoacetyl-p-phenylene-diamine. | Do. |
| 24 | ___do___ | cyclohexylamine. | Do. |
| 25 | 4-chloro-2-aminophenol. | 1-aminobenzene-2:5-disulfonic acid. | violet-red. |
| 26 | 2-aminophenol-4-sulfonamide. | 1-amino-2-carboxybenzene-4-sulfonic acid. | ruby-red. |
| 27 | ___do___ | 1-aminobenzene-2-sulfonic acid. | Do. |
| 28 | ___do___ | 1-aminobenzene-3-sulfonic acid. | Do. |
| 29 | 2-aminophenol-4-methylsulfone. | ___do___ | Do. |
| 30 | 6-nitro-4-methyl-2-aminophenol. | 1-aminobenzene-2:5-disulfonic acid. | red-violet. |

EXAMPLE 3

45.3 parts of the dyestuff obtained by coupling diazotised 1-methoxy-2-aminobenzene-4-sulfonic acid with 1-amino-5-hydroxynaphthalene-7-sulfonic acid in a solution rendered alkaline with sodium carbonate are dissolved in 1400 parts of water, and 10 parts of monoethanolamine are added. At 60° C. a solution is added of 30 parts of crystalline copper sulfate in 100 parts of water and 50 parts of ammonia solution of 25% strength, and the whole is refluxed on a boiling water bath for 4 to 6 hours. 250 parts of sodium chloride are added, the reaction mixture is allowed to cool, and the precipitated copper complex is filtered off and then further worked up as described in Example 1. A dyestuff is obtained which has practically identical properties.

EXAMPLE 4

43.9 parts of the dyestuff of the formula

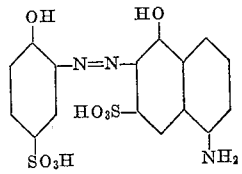

(see 1st paragraph of Example 1) are dissolved in 600 parts of water and rendered weakly alkaline with a small amount of sodium carbonate. 120 parts of a solution of sodium chromosalicylate containing 2.6% of chromium are added, the mixture is refluxed at the boil for 4 hours, cooled, and then neutralised with hydrochloric acid.

The resulting solution of the 1:2-chromium complex is added to a fine, aqueous, ice-cooled suspension of 19 parts of cyanuric chloride, the mineral acid formed being neutralised with dilute sodium hydroxide solution. After 1 hour 40 parts of ammonia solution of 10% strength are added, and the mixture is allowed to react for 3 hours at 30 to 40° C. The dyestuff formed can be isolated by evaporating the solution in vacuo. It dyes cotton covered grey-violet tints of good fastness to light and very good fastness to wetting.

EXAMPLE 5

43.9 parts of the dyestuff of the formula shown in Example 4 are dissolved in 800 parts of water with the addition of 120 parts of N-sodium hydroxide solution, treated with 100 parts of a cobalt sulfate solution containing 3.2% of cobalt, and the whole is heated for 1 hour at 80° C., then cooled, and neutralised with hydrochloric acid.

The resulting solution is treated at 0° C. with a solution of 18.5 parts of cyanuric chloride in 60 parts of acetone. The mixture is stirred for 2 hours and constantly kept weakly acid to litmus by continually adding dilute sodium hydroxide solution. 9.5 parts of aniline and 10 parts of sodium bicarbonate are then added, and the mixture is heated to 25° C. The resulting dyestuff dyes cotton covered brown-violet tints.

EXAMPLE 6

An ice-cooled solution of the copper complex obtained as described in the first and second paragraphs of Example 1 is mixed with a solution of 18.5 parts of cyanuric chloride in 60 parts of acetone, and in the course of 1 hour the reaction mixture is neutralised by gradually adding dilute sodium hydroxide solution. A solution of 9.5 parts of phenol and 4 parts of caustic soda in 100 parts of water is then added, and the mixture is allowed to react for 1 to 2 hours at room temperature. The dyestuff is then salted out, filtered off and dried. It dyes cotton ruby-red tints.

A dyestuff having similar properties is obtained when 11.1 parts of thiophenol instead of 9.5 parts of phenol are used.

The 9.5 parts of phenol may also be replaced by 19.6 parts of the sodium salt of phenol-3-sulfonic acid or of phenol-4-sulfonic acid. By virtue of the considerable solubility the dyestuffs formed can in this case be obtained by treating the reaction mixture with equal parts of monosodium and disodium phosphate and evaporating it to dryness in vacuo. These dyestuffs produce on cotton ruby-red tints having very good properties of fastness.

EXAMPLE 7

The procedure is the same as that used in Example 1, except that the primary condensation product from cyanuric chloride and methanilic acid is replaced by a solution of 18 parts of 6-methoxy-2:4-dichlorotriazine in 100 parts of acetone. A dyestuff is obtained which dyes cotton fast ruby-red tints.

EXAMPLE 8

50 parts of the copper complex of the formula

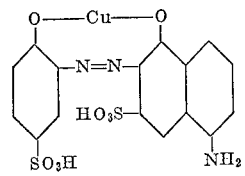

are dissolved in 1200 parts of water. The solution is rendered neutral and treated portionwise at room temperature with 15 parts of β-chloropropionyl chloride, and the mineral acid formed is gradually neutralised with a dilute sodium hydroxide solution, or by strewing in solid sodium bicarbonate. On completion of the reaction the dyestuff is salted out, filtered off and dried. It dyes cotton fast ruby-red tints.

Dyestuffs having similar properties are obtained when the β-chloropropionyl chloride is replaced by an appropriate proportion of α:β-dichloropropionyl chloride or acrylyl chloride or α:β-dibromopropionyl chloride or acrylic anhydride or chloromaleic anhydride.

EXAMPLE 9

A solution of 50 parts of the copper complex mentioned in Example 8 in 1000 parts of water is neutralised with sodium carbonate. 25 parts of crystalline sodium acetate and a solution of 20 parts of 2:4:6-trichloropyrimidine in 200 parts of alcohol are then added, and the mixture is vigorously stirred for 4 hours at 50 to 60° C. The dyestuff formed is salted out, filtered off and dried. It dyes cotton ruby-red tints. The analysis of the dyestuff reveals that it contains 1.9 atoms of chlorine for every azo group.

EXAMPLE 10

40.4 parts of the dyestuff obtained from diazotised 4-nitro-2-aminophenol and 1-amino-5-hydroxynaphthalene-7-sulfonic acid in a solution rendered alkaline with sodium carbonate, in the presence of pyridine bases, are converted into the corresponding chromium complex as described in Example 4. This complex is salted out with sodium chloride, filtered off, again dissolved in 1000 parts of water containing 10 parts of sodium bicarbonate, and mixed at 30 to 40° C. with a neutralized solution of the primary condensation product from 19 parts of cyanuric chloride and 17.3 parts of 1-aminobenzene-3-sulfonic acid. On completion of the reaction the dyestuff is salted out and filtered off. It dyes cotton fast reddish black-grey tints.

A greenish blue-gray dyestuff having similar properties is obtained by replacing the above 4-nitro-2-aminophenol by the corresponding 5-nitro-compound.

EXAMPLE 11

A solution of 26.1 parts of the sodium salt of 1-amino-5-hydroxy-naphthalene-7-sulfonic acid in 400 parts of water is mixed with an aqueous solution of 34.2 parts of the sodium salt of 6-(3'-sulfophenyl)-amino-2:4-dichlorotriazine, and the mixture is heated to 25 to 30° C. In the course of 2 to 3 hours a dilute solution of sodium hydroxide is added dropwise in a manner such that the pH value of the reaction mixture remains constant at 5.5 to 6.6.

The resulting solution of the monochlorotriazine compound is cooled to 0 to 5° C. and mixed with 20 parts of sodium bicarbonate. The diazo compound obtained in the usual manner from 17.3 parts of 1-aminobenzene-3-sulfonic acid is then run in. The dyestuff formed in this manner dyes cellulose fibers red-orange tints which are very fast to washing.

By using as the diazo component 1-aminobenzene-2-sulfonic acid or 1-aminobenzene-2-carboxylic acid, dyestuffs are obtained which yield slightly more yellowish or reddish tints respectively. 1-amino-4-methoxybenzene-2-sulfonic acid dyes red tints, as does 2-aminonaphthalene-4:8-disulfonic acid.

The triazine compound used in the above example can be replaced by an equal amount of 6-(4'-sulfophenyl)-amino-2:4-dichlorotriazine, to yield dyestuffs having very similar properties.

Alternatively, the dyestuff used in this example can be prepared by coupling the diazo compound of 1-aminobenzene-3-sulfonic acid in a solution alkalinised with sodium carbonate with 1-amino-5-hydroxynaphthalene-7-sulfonic acid, and treating the resulting dyestuff with the triazine derivative.

A slightly purer dyestuff results by using as coupling component 1 - acetylamino - 5 - hydroxynaphthalene - 7 - sulfonic acid and eliminating the acetyl group hydrolytically after having performed the coupling reaction.

What is claimed is:
The copper complex compound of the monoazo dyestuff which, in its free acid state, corresponds to the formula

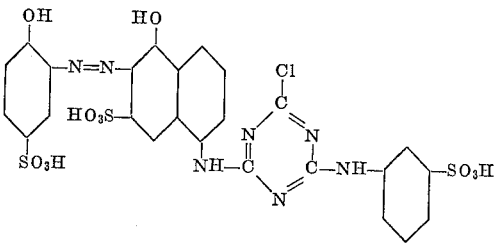

References Cited in the file of this patent
UNITED STATES PATENTS

| | | |
|---|---|---|
| 654,064 | Julius | July 17, 1900 |
| 1,886,480 | Haller et al. | Nov. 8, 1932 |
| 2,041,851 | Mendoza | May 26, 1936 |
| 2,873,269 | Fasciati et al. | Feb. 10, 1959 |
| 2,892,671 | Alsberg et al. | June 30, 1959 |

OTHER REFERENCES

Wegmann: "Textil-Praxis," October 1958, pages 1056–1059.

UNITED STATES PATENT OFFICE
CERTIFICATE OF CORRECTION

Patent No. 3,133,909                          May 19, 1964

Henri Riat

It is hereby certified that error appears in the above numbered patent requiring correction and that the said Letters Patent should read as corrected below.

In the grant, lines 1 and 2, for "assignor to Ciba Company, Inc., of Fair Lawn, New Jersey," read -- assignor to Ciba Corporation, a corporation of Delaware, --; line 11, for "Ciba Company, Inc., its successors" read -- Ciba Corporation, it successors --; in the heading to the printed specification, lines 3 and 4, for "assignor to Ciba Company, Inc., Fair Lawn, N. J." read -- assignor to Ciba Corporation, a corporation of Delaware --; column 2, line 33, for "amonia" read -- ammonia --; line 57, after "that" insert -- is --; column 3, lines 72 and 73, for "salicyclic" read -- salicylic --; column 4, line 13, for "tetramine" read -- tetrammine --; line 73, for "then" read -- their --; column 6, in the table, under the heading "II" and opposite "No. 7", for "-4-sulfinic" read -- -4-sulfonic --; column 8, line 6, for "methanilic" read -- metanilic --.

Signed and sealed this 22nd day of December 1964.

(SEAL)
Attest:

ERNEST W. SWIDER
Attesting Officer

EDWARD J. BRENNER
Commissioner of Patents